United States Patent [19]
Gardy et al.

[11] 3,983,990
[45] Oct. 5, 1976

[54] CONVEYOR MECHANISM

[75] Inventors: Victor R. Gardy, Shelburne; Edward G. Farmer, Underhill Center, both of Vt.

[73] Assignee: General Electric Company, Burlington, Vt.

[22] Filed: Feb. 19, 1975

[21] Appl. No.: 550,951

[52] U.S. Cl. ............................. 198/853; 198/655; 89/35 A
[51] Int. Cl.² ......................................... B65G 17/06
[58] Field of Search ................. 198/131, 189, 195; 59/85, 86, 93; 74/252; 89/35 R, 35 A

[56] References Cited
UNITED STATES PATENTS

| | | | |
|---|---|---|---|
| 1,362,523 | 12/1920 | Blouen | 59/93 |
| 1,956,298 | 4/1934 | Paulson | 198/189 X |
| 2,065,931 | 12/1936 | Alling | 198/189 |
| 2,290,981 | 7/1942 | Maguire et al. | 198/189 |
| 3,188,794 | 6/1965 | Johnson | 59/85 X |
| 3,253,512 | 5/1966 | Schallehn | 89/35 A |
| 3,269,525 | 8/1966 | Paulski | 198/189 |
| 3,344,905 | 10/1967 | von Hofen | 198/189 |
| 3,429,221 | 2/1969 | Kirkpatrick | 89/33 BC |
| 3,788,450 | 1/1974 | Tschunt et al. | 198/131 |

*Primary Examiner*—Evon C. Blunk
*Assistant Examiner*—Richard K. Thomson
*Attorney, Agent, or Firm*—Bailin L. Kuch

[57] ABSTRACT

A cradle is provided for use in a train of cradles in a constraining chute which has a universal joint intercoupling adjacent cradles. A joint is provided by a truncated male sphere on one cradle and a slotted female sphere on the next adjacent cradle. Each cradle is made in one piece and is provided with one male and one female sphere.

6 Claims, 3 Drawing Figures

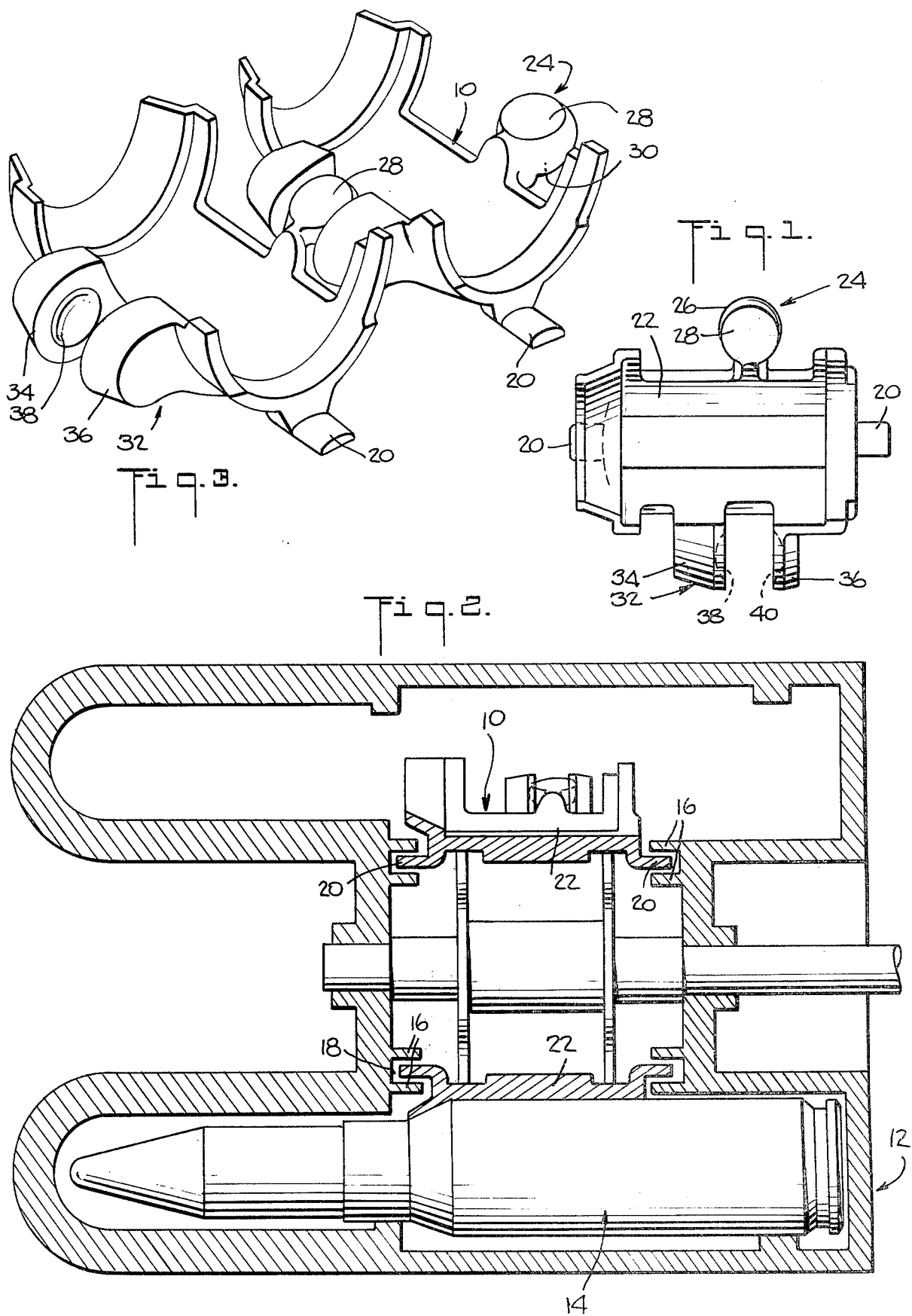

CONVEYOR MECHANISM

BACKGROUND OF THE INVENTION

1. Field of Use

This invention relates to an improved conveyor mechanism, particularly to an endless conveyor assembly for linkless rounds of ammunition for high rate of fire weapon systems.

2. Prior Art

An endless conveyor system for linkless rounds of ammunition for high rate of fire weapon systems is shown in U.S. Pat. No. 3,429,221 issued to R. G. Kirkpatrick on Feb. 25, 1969. In this system, an endless train of rounds cradles is designed to be pulled through a chute which limits and guides the train. An improved, pushable and pullable cradle is shown in U.S. Pat. No. 3,800,937 issued to D. P. Tassie on Apr. 2, 1974. Each of the cradles is coupled to the next adjacent cradle by a universal connection, comprising a clevis which receives a tongue, and a transverse stud passing through aligned transverse bores in the clevis and the tongue. The stud has a medial, sphere-like enlargement which is aligned with the tongue, and the arms of the clevis are spaced from the tongue so that a limited amount of twist is permitted between adjacent cradles. Other systems, for example, may be found in U.S. Pat. No. 3,190,179 issued to P. H. Benoit on June 22, 1965; U.S. Pat. No. 3,254,565 issued to C. E. LaFever et al. on June 7, 1966; and U.S. Pat. No. 2,915,947 issued to R. Heely on Dec. 8, 1959.

The cradles or links of these systems each require a plurality of machined parts.

SUMMARY OF THE INVENTION

It is an object of this invention to provide a cradle for the Kirkpatrick type system which will require but one part per cradle and will eliminate machining by permitting the cradle to be cast complete i.e., each cradle will be an integral structure.

A feature of this invention is the provision of a cradle of integral structure for use in a train of cradles in a constraining chute which has a universal joint intercoupling adjacent cradles. More particularly, the joint is provided by a truncated male sphere on one cradle and a slotted female sphere on the next adjacent cradle. Each cradle is provided with one male and one female sphere.

BRIEF DESCRIPTION OF THE DRAWING

These and other objects, features, and advantages of the invention will be apparent from the following specification thereof when taken in conjunction with the accompanying drawing in which:

FIG. 1 is a top plan view of a cradle or conveyor element embodying this invention;

FIG. 2 is a front view in elevation of the cradle of FIG. 1, shown disposed in a chute of U.S. Pat. No. 3,429,221; and FIG. 3 is a perspective view of a train of cradles of FIG. 1, adapted to ride in the chute.

DESCRIPTION OF THE PREFERRED EMBODIMENT

The conveyor system includes an endless train of rounds cradles 10 guided by and within a chute 12. Each cradle or element of the train is adapted to carry a round of ammunition 14 or a fired cartridge case. The chute may be rigid as shown in FIG. 2; or may be flexible as shown, for example, in U.S. Pat. No. 2,479,633 by W. L. MacKenzie issued Aug. 23, 1949, to permit limited twist and fan. The chute guides and controls the train of cradles and, in conjunction with the cradles, guides and controls the rounds of cases.

The chute has four pairs of spaced apart ribs 16, each pair of which forms a guide channel 18 to receive a foot 20 extending from the cradle. The cradle rides on and is pivotable about these feet.

Each cradle has a body portion 22, a pair of spaced apart depending feet 20, a leading rigid arm 24 which terminates in a distal male sphere 26, which sphere is truncated by a pair of top and bottom flat surfaces 28 and 30, and a trailing rigid arm 32 which is formed as a clevis having two mutually spaced apart arms 34 and 36, which arms have two mutually opposed concavities 38 and 40, which concavities together define a slotted female sphere.

The width of the space or slot between the two arms 34 and 36 is made slightly greater than the thickness of the male sphere between the two flat surfaces 28 and 30. Thus, when adjacent cradles are angularly displaced by 90°, the male sphere of one cradle may be passed through the slot of the female sphere of the adjacent cradle. The diameter of the male sphere is greater than the width of the slot. Rotating the adjacent cradles, out of the 90° angular misalignment, will interlock the male sphere within the female sphere. The spheres may be similarly unlocked. Depending on the clearance provided between the slot in the female sphere and the thickness between the flats on the male sphere, adjacent cradles may be angularly misaligned closely approaching 90° while still being positively intercoupled. Conventionally, because of the limitations effected by the guides 16 and the arms 24 and 32, adjacent cradles do not undergo a mutual angular displacement greater than 12°. Thus, in all conventional usages, a major portion of the male and female spheres remain in contact to provide an adequate bearing surface to prevent destruction and uncoupling of the resultant universal coupling in use.

What is claimed is:

1. An endless conveyor system comprising:
   a chute having a pair of longitudinally extending, transversely opposed channels; and
   an endless train of cradles for movement along said chute, each cradle having as a one-piece, integral structure all of the following:
   a load-supporting platform,
   a rigid leading arm fixed to said platform and projecting longitudinally therefrom,
   a rigid trailing arm fixed to said platform and projecting longitudinally therefrom,
   a pair of transversely spaced apart feet means fixed to said platform and projecting transversely therefrom and respectively disposed in and transversely constrained by said channels,
   one of said arms terminating in a male sphere,
   said male sphere being truncated by a pair of mutually spaced apart and parallel surfaces define a beam of a first thickness,
   the other of said arms terminating in a clevis having a pair of subarms mutually spaced apart to define a slot of a second thickness greater than said first thickness, whereby when adjacent cradles are angularly displaced by 90°, the beam of one cradle may be passed into the slot of the adjacent cradle, the inner faces of said subarms which define said slot each having a respective concavity, said pair of concavities mutually defining a slotted female sphere, the planar orientation of said slot being perpendicular to the planar orientation of said truncated male sphere, and immediately adjacent cradles having the male sphere of one cradle disposed within the female sphere of the other cradle.

2. A system according to claim 1, wherein:

each of said platforms is adapted to support and constrain a round of ammunition.

3. A cradle for an endless train of cradles, comprising as a one piece, integral structure:

a load-supporting platform;

a rigid leading arm fixed to said platform and projecting longitudinally therefrom on a first axis;

a rigid trailing arm fixed to said platform and projecting longitudinally therefrom on said first axis;

a pair of transversely spaced apart feet means fixed to said platform and projecting transversely therefrom;

one of said arms terminating in a male sphere, said male sphere being truncated by a pair of mutually spaced apart and parallel surfaces which are parallel to said first axis; and the other of said arms terminating in a clevis having a pair of subarms mutually spaced apart to define a slot, the inner faces of said subarms which define said slot each having a respective concavity, said pair of concavities mutually defining a slotted female sphere, the planar orientation of said slot being perpendicular to the planar orientation of said truncated male sphere.

4. A cradle according to claim 3, wherein:

said feet means define an axis of rotation for said platform.

5. A cradle according to claim 3, wherein:

the thickness of said slot is slightly greater than the thickness between said truncating surfaces of said male sphere and less than the diameter of said male sphere.

6. A system according to claim 1, wherein:

the thickness of said slot is slightly greater than the thickness between said truncating surfaces of said male sphere and less than the diameter of said male sphere.

* * * * *